United States Patent
Arisoy et al.

(10) Patent No.: US 9,484,023 B2
(45) Date of Patent: Nov. 1, 2016

(54) CONVERSION OF NON-BACK-OFF LANGUAGE MODELS FOR EFFICIENT SPEECH DECODING

(71) Applicant: International Business Machines Corporation, Armonk, NY (US)

(72) Inventors: Ebru Arisoy, New York, NY (US); Bhuvana Ramabhadran, Mt. Kisco, NY (US); Abhinav Sethy, Chappaqua, NY (US); Stanley Chen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/773,880

(22) Filed: Feb. 22, 2013

(65) Prior Publication Data

US 2014/0244248 A1 Aug. 28, 2014

(51) Int. Cl.
*G10L 15/00* (2013.01)
*G10L 15/18* (2013.01)
*G10L 15/197* (2013.01)

(52) U.S. Cl.
CPC ............. *G10L 15/18* (2013.01); *G10L 15/197* (2013.01)

(58) Field of Classification Search
None
See application file for complete search history.

(56) References Cited

U.S. PATENT DOCUMENTS

| | | | |
|---|---|---|---|
| 8,332,207 B2 | 12/2012 | Brants et al. | |
| 2002/0116196 A1* | 8/2002 | Tran ..................... | G06F 1/3203 704/270 |
| 2010/0211378 A1 | 8/2010 | Bulyko | |
| 2011/0224971 A1* | 9/2011 | Moore .................. | G06F 17/271 704/9 |
| 2012/0095752 A1 | 4/2012 | Paek et al. | |

OTHER PUBLICATIONS

Imed Zitouni1 and Qiru Zhou2, Linearly Interpolated Hierarchical N-gram Language Models for Speech Recognition Engines, Jun. 2007, 1IBM T.J. Watson Research Center, NY, 2Bell Labs Alcatel-Lucent, NJ, Page: all USA URL: http://cdn.intechopen.com/pdfs-wm/120.pdf.*

GwenolLecorve, Petr MotlicekConversion of Recurrent Neural Network Language Models to Weighted Finite State Transducers for Automatic Speech Recognition, Date: Jul. 2012 URL: http://publications.idiap.ch/downloads/reports/2012/Lecorve_Idiap-RR-21-2012.pdf.*

Gw'enol'e Lecorv'e, Petr MotlicekConversion of Recurrent Neural Network Language Models to Weighted Finite State Transducers for Automatic Speech Recognition, Date: Jul. 2012 URL: http://infoscience.epfl.ch/record/192736/files/Lecorve_Idiap-RR-21/2012.pdf.*

Andreas Stolcke, Entropy-based Pruning of Backoff Language Models, Jun. 2000, Speech Technology and Research Laboratory SRI International Menlo Park, California, Pages: All URL: http://arxiv.org/pdf/cs/0006025.pdf.*

(Continued)

*Primary Examiner* — Vincent Rudolph
*Assistant Examiner* — Richa Mishra
(74) *Attorney, Agent, or Firm* — William Stock; Ryan, Mason & Lewis, LLP (57) ABSTRACT

Techniques for conversion of non-back-off language models for use in speech decoders. For example, a method comprises the following step. A non-back-off language model is converted to a back-off language model. The converted back-off language model is pruned. The converted back-off language model is usable for decoding speech.

18 Claims, 4 Drawing Sheets

(56) References Cited

OTHER PUBLICATIONS

H. Schwenk et al., "Connectionist Language Modeling for Large Vocabulary Continuous Speech Recognition," IEEE International Conference on Acoustics, Speech, and Signal Processing (ICASSP), May 2002, pp. 765-768, vol. 1.*

A. Deoras et al., "Variational Approximation of Long-Span Language Models for LVCSR," IEEE International Conference on Acoustics, Speech, and Signal Processing (ICASSP), May 2011, pp. 5532-5535, Prague Congress Center, Prague, Czech Republic.

W. Wang et al., "The Use of a Linguistically Motivated Language Model in Conversational Speech Recognition," IEEE International Conference on Acoustics, Speech, and Signal Processing (ICASSP), May 2004, pp. 261-264, vol. 1.

Y. Bengio et al., "A Neural Probabilistic Language Model," The Journal of Machine Learning Research, Mar. 2003, pp. 1137-1155, vol. 3.

Holger Schwenk, "Continuous Space Language Models," Computer Speech and Language, Jul. 2006, pp. 492-518, vol. 21, No. 3.

Andreas Stolcke, "Entropy-Based Pruning of Backoff Language Models," DARPA Broadcast News Transcription and Understanding Workshop, 1998, pp. 270-274.

S.F. Chen et al., "Advances in Speech Transcription at IBM Under the DARPA EARS Program," IEEE Transactions on Audio, Speech, and Language Processing, Sep. 2006, pp. 1596-1608, vol. 14, No. 5.

\* cited by examiner

CONVERSION OF NON-BACK-OFF LANGUAGE MODELS FOR EFFICIENT SPEECH DECODING

FIELD

The present application relates to speech decoding systems and, more particularly, to language models in such speech decoding systems.

BACKGROUND

As is well known, a language model is used to represent the language that an automatic speech recognition (ASR) system is intended to recognize or decode. One of the most popular types of language models is the probabilistic n-gram language model. An n-gram is a contiguous sequence of n items, e.g., words (although the items could alternatively be phonemes, syllables, letters or base pairs), from a given sequence of text or speech. In the n-gram language model, the probability that a word $w_n$ follows a sequence of words $w_1, w_2, \ldots, w_{n-1}$ is defined. However, depending on the selected size of n, and how many words are in the vocabulary of the given language, the number of n-grams that must be defined in the language model can be prohibitive.

As such, in order to deal with this issue, existing decoders in ASR systems utilize n-gram back-off language models in the decoding process. A back-off language model uses the conditional probability, $P(w|h)$, for a finite set of word, w, and history, h, pairs, and backs off to lower order n-gram probabilities for other pairs. In this way, an n-gram language model is represented efficiently using a more moderate number of n-grams.

The so-called ARPA (Advanced Research Projects Agency) back-off format, where each line represents an n-gram language model probability, an n-gram and the back-off weight corresponding to this n-gram, is commonly used to represent an n-gram back-off language model.

Note that instead of words, named-entities can also be used in language modeling. In this context, a named-entity is defined as a sequence of words that refers to names of entities such as people (e.g., John Smith), organizations (e.g., United Nations) and locations (e.g., New York).

SUMMARY

Embodiments of the invention provide techniques for conversion of non-back-off language models for use in speech decoders.

For example, in one embodiment, a method comprises the following step. A non-back-off language model is converted to a back-off language model. The converted back-off language model is pruned. The converted back-off language model is usable for decoding speech.

These and other objects, features, and advantages of the present invention will become apparent from the following detailed description of illustrative embodiments thereof, which is to be read in connection with the accompanying drawings.

DETAILED DESCRIPTION

Embodiments of the invention directed to converting a non-back-off language model into a back-off language model will be described herein below in the context of an illustrative non-back-off language model, e.g., a neural network language model (NNLM). However, it is to be understood that the language model conversion techniques described herein are not limited to this specific type of non-back-off language model but are more generally applicable to any non-back-off language model that is suitable for integration into the speech decoding process. Also, while illustrative embodiments describe language model conversion techniques for use in ASR systems, it is to be understood that the language model conversion techniques described herein may be used in other speech decoding systems such as, by way of example only, machine translation systems.

As used herein, the phrase "non-back-off language model" is defined as a language model that is not a back-off language model.

NNLMs are well known and popular non-back-off language models that have been applied to large vocabulary continuous type ASR systems (so-called LVCSR systems) in an n-best or lattice rescoring framework. In NNLMs, words are projected onto continuous space and n-gram probabilities are estimated in this space using a feed forward neural network. After training the NNLM, a continuous space projection layer, a hidden layer and output layer weights are stored and each history requires on-the-fly calculation of the NNLM probabilities during decoding. Therefore using NNLMs in decoding can be computationally expensive. The use of NNLM directly in decoding has been investigated but this resulted in very long decoding times. As a result, existing LVCSR systems utilize NNLMs in a lattice or n-best list rescoring framework where all the required n-grams are known and precomputed in advance. When an NNLM is applied in a rescoring framework, the NNLM search space is restricted with the baseline language model used in decoding. However, early integration of the NNLM into the decoder avoids this restriction and it can further improve the system performance. Furthermore, lattice or n-best list rescoring also introduces latency to the system.

The use of a recurrent NNLM (RNNLM), or a long span language model, has been proposed. The decoding process using an RNNLM is a two-step process. First, text data is simulated based on the long span language model probability distribution and then this text is used to build a conventional n-gram language model in the ARPA back-off format.

Another approach for using an RNNLM in decoding is to convert this model into a weighted finite state transducer (WFST) by approximating the underlying probability distribution. This approach contains discretization of the continuous space representation of the word histories to build WFST states and the arcs have the probabilities derived from the RNNLM.

Converting the SuperARV language model, a syntactic language model based on Constraint Dependency Grammar, into ARPA back-off format was proposed in order to use this model efficiently in the decoding process. In addition to being a syntactic language model, SuperARV is a back-off language model where the back-off order is defined from more fine-grained to coarser history information where the history contains word and tag sequences. In this approach, an ARPA style back-off language model is generated by using word SuperARV probability estimates and pruning is used to reduce the number of n-grams in the model.

Embodiments of the invention provide for converting a non-back-off language model directly into a back-off language model in order to make it efficient to use in decoding without making any changes to existing decoders. Theoretically, NNLM can assign probability to any n-gram that can be generated with the language model vocabulary. Therefore, the NNLM is not a back-off language model. In illustrative embodiments, an NNLM is converted into a back-off language model by using a background language model and this back-off language model is efficiently represented using the ARPA back-off format. That is, language model conversion embodiments of the invention start with a non-back-off language model and convert it into a back-off language model without simulating text data and discritizing the histories. As mentioned above, language model conversion embodiments of the invention can be easily applied to any non-back-off n-gram language model for easy integration of this model into the decoding process for an ASR system.

The converted back-off language model can be very large due to continuous space representation of the histories. Therefore, in illustrative embodiments, the model is first pruned with entropy-based pruning and later represented in the ARPA-back-off format. As will be described below, illustrative embodiments provide a hierarchical methodology to make the problem for entropy-based pruning tractable. Furthermore, non-back-off language model probability and relative entropy calculations can be parallelized for a faster implementation.

Accordingly, embodiments of the invention allow non-back-off language models, such as NNLMs, to be utilized in decoding without making any changes in existing decoders. Further, embodiments of the invention make the problem tractable, even though the search space for pruning is very large, especially for the NNLM. Still further, embodiments of the invention do not restrict the n-grams with the n-grams present in the training text. Thus, advantageously, the final pruned back-off language model can also contain n-grams that were not present in the training text.

Figure 1:
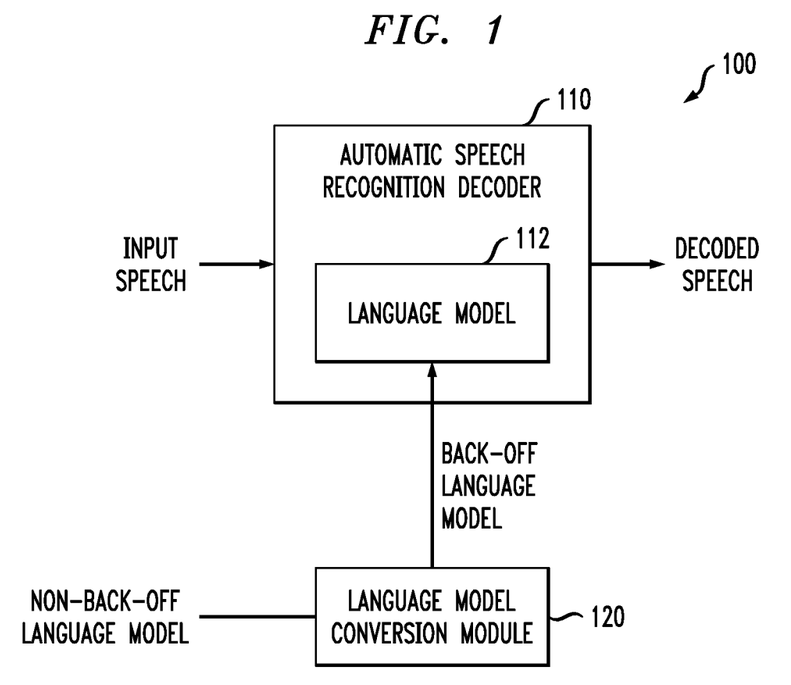
FIG. 1 illustrates an automatic speech recognition system with a language model conversion module, according to an embodiment of the invention.

FIG. 1 illustrates an automatic speech recognition system with a language model conversion module, according to an embodiment of the invention. As shown, ASR system 100 includes an ASR decoder 110 and a language model conversion module 120. Of course, ASR system 100 includes other components which are not shown for the sake of simplicity and since they are not the focus of language model conversion embodiments of the invention. The ASR decoder 110 includes a language model 112 which represents the language that the ASR system 100 is intended to recognize or decode.

In accordance with one or more embodiments of the invention, the language model conversion module 120 converts a non-back-off language model into a back-off language model. The converted model output by the module 120 is the language model 112 used by the ASR decoder 110 to recognize speech input to the system 100 so as to generate a decoded speech output.

Before describing an illustrative embodiment of the language model conversion methodology, a description of an NNLM will be given. Note that the NNLM is one example of a non-back-off language model that can be converted into a back-off language model by embodiments of the invention.

Figure 2:
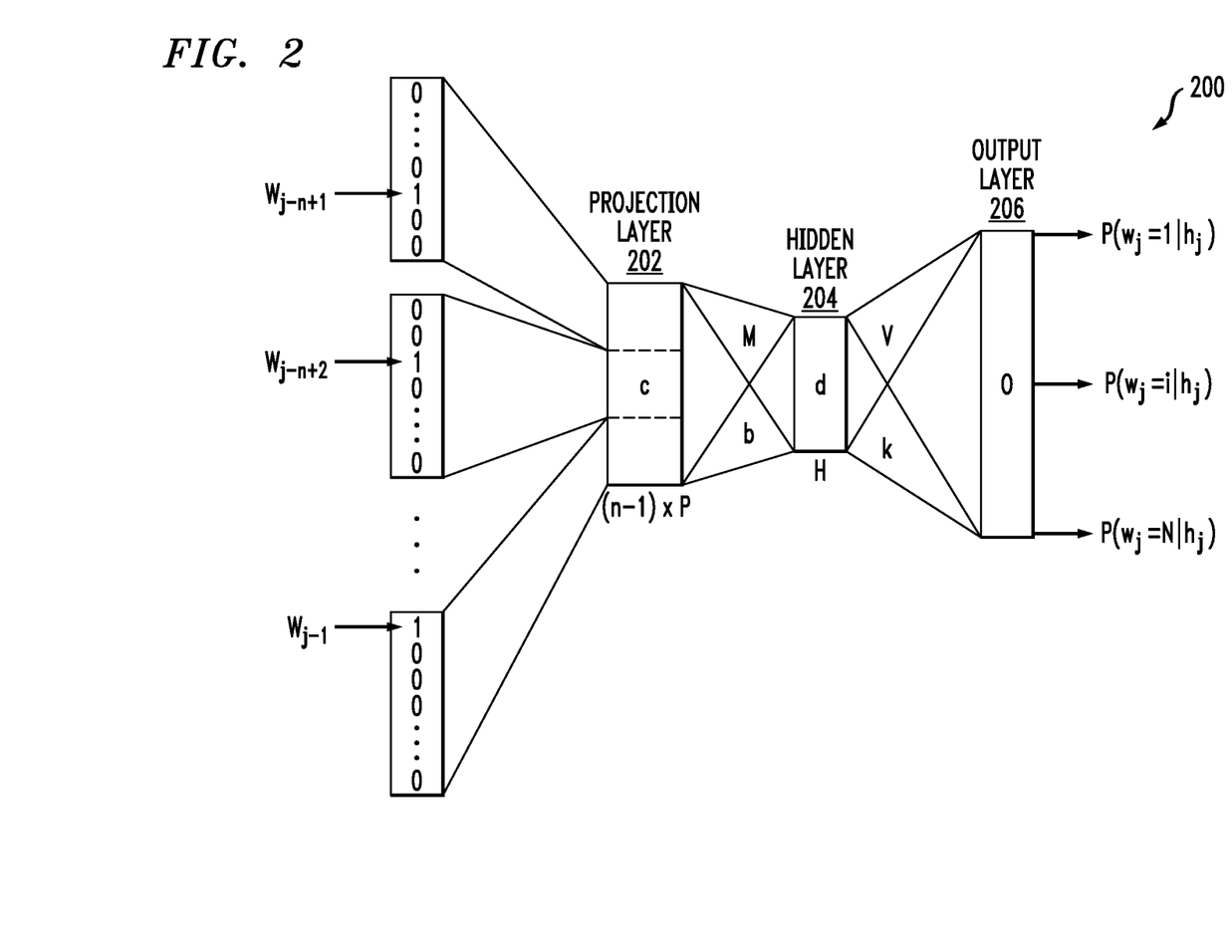
FIG. 2 illustrates a neural network language model architecture.

FIG. 2 illustrates an exemplary NNLM architecture 200. This architecture was proposed in Y. Bengio et al., "A Neural Probabilistic Language Model," Journal of Machine Learning Research, 3:1137-1155, 2003, the disclosure of which is incorporated by reference herein in its entirety. Of course, other NNLMs could be used in alternative embodiments.

In NNLM 200, each word in the vocabulary is represented by a |V| dimensional sparse vector where only the index of that word is 1 and the rest of the entries are 0. Note that V is the language model vocabulary. The input to the network is the concatenated discrete feature representations of n−1 previous words (history), in other words, the indices of the history words. Each word is mapped to its continuous space representation using linear projections. The continuous feature vectors of the history words are concatenated and projection layer 202 is formed. Hidden layer 204 has H hidden units and it is followed by hyperbolic tangent non-linearity. Output layer 206 has N targets followed by the softmax function. The softmax function ensures that the output values of the NNLM are between 0 and 1. So that, the outputs of the NNLM, $P(w_j=i|h_j)$, are the language model probabilities of each word in the output vocabulary for a specific history, $h_j$. In FIG. 2, c represents the linear activations in the projection layer 202. M represents the weight matrix between the projection layer 202 and the hidden layer 204. R represents the weight matrix between the hidden layer 204 and the output layer 206. Lastly, b and k are the hidden and output layer bias vectors, respectively. A standard back-propagation algorithm is used to train the model.

The computational complexity of the NNLM is dominated by H×N multiplications at the output layer. Therefore, a shortlist containing only the most frequent words in the vocabulary is used as the output targets to reduce output layer complexity. This shortlist, called the output vocabulary, is denoted by $V_o$. Since the NNLM distributes the probability mass to only the target words, all n-grams having out-of-output vocabulary words as the predicted word get "0" probability. Smoothing is performed using a background language model as given in equation 1 below where $P_{NNLM}(w|h)$ and $P_{BLM}(w|h)$ represent the NNLM and background language model probabilities, respectively. $\beta(h)$ represents the normalization constant for history h. $\beta(h)$ is calculated as given in equation 2 below so that:

$$\sum_{w \in V} P(w|h) = 1. \qquad \text{Eq. 1}$$

$$P(w|h) = \begin{cases} \beta(h) P_{NNLM}(w|h) & \text{if } w \in V_o \\ P_{BLM}(w|h) & \text{otherwise} \end{cases}$$

$$\beta(h) = \sum_{w \in V_o} P_{BLM}(w|h) \qquad \text{Eq. 2}$$

The approach and formulations for converting a non-back-off language model into a back-off language model will now be given for the NNLM. However, this approach can be applied to any language model that can assign a probability to any fixed order n-gram (i.e., any co-occurrence and feature-based n-gram language model), e.g., a non-back-off 4-gram language model assigns probability to all the 4-gram events.

Due to the continuous space representation of the histories, the NNLM assigns probability to all the n-grams that can be generated with the language model vocabulary, $(|V|^n$ n-grams). Therefore, the NNLM is not a back-off language model. Note that if a shortlist is used at the output layer, the n-grams where the predicted word is not in the output vocabulary, ($|V|^{n-1} \times (|V|-|V_o|)$) n-grams, will get "0" probability.

However, these zero probabilities are smoothed by using a background language model as given by equation 1 above.

In a back-off language model, i.e., a conventional n-gram language model, if an n-gram is not explicitly represented in the model, the probability of the n-gram is obtained by backing off to the lower order n-gram as follows:

$$P(w|h) = \alpha(h)P(w|h') \quad \text{Eq. 3}$$

Here, $\alpha(h)$ is the back-off weight associated with the history and h' is the truncated history obtained by dropping the last word in the history, h.

An illustrative embodiment of the invention uses equation 1 to convert the NNLM into a back-off language model. Assume that we have a NNLM and a background language model which is a back-off n-gram language model. Both of the language models have the same n-gram order, e.g., both of them are 4-grams. Since the background language model is a back-off language model, it is represented as follows:

$$P_{BLM}(w|h) = \begin{cases} P_{BLM}(w|h) & \text{if } w: \neg BO(w, h) \\ \alpha(h)P_{BLM}(w|h') & \text{otherwise} \end{cases} \quad \text{Eq. 4}$$

In other words, if an n-gram is explicitly listed in the model or it is a non-back-off n-gram:

$$w: \neg BO(w,h)$$

the probability of that n-gram is used. Otherwise, the weighted probability of the lower order n-gram is used.

Intuitively, conventional n-gram language models provide robust estimates when word and history, (w, h), pairs are seen enough times in the language modeling training text. Whereas, NNLMs provide better estimates than conventional n-gram language models, especially for rare or unseen n-grams. Considering this fact, equation 4 can be modified as follows:

$$P(w|h) = \begin{cases} P_{BLM}(w|h) & \text{if } C_{est}(w, h) > K \\ \beta(h)P_{NNLM}(w|h) & \text{if } w \in V_o \wedge C_{est}(w, h) < K \\ P_{BLM}(w|h) & \text{otherwise} \end{cases} \quad \text{Eq. 5}$$

Here $C_{est}(w,h)$ represents the estimated count of (w,h) pair and K is the count threshold. In short, the above equation denotes that if the estimated count of a (w,h) pair is above a given threshold, use the background language model probabilities. Otherwise use NNLM probabilities smoothed with the background language model.

When $P_{BLM}(w|h)$ in equation 1 is replaced with equation 4, equation 6 is obtained:

$$P(w|h) = \begin{cases} \beta(h)P_{NNLM}(w|h) & \text{if } w \in V_o \\ P_{BLM}(w|h) & \text{if } w \notin V_o \wedge w: \neg BO(w, h) \\ \alpha(h)P_{BLM}(w|h') & \text{if } w \notin V_o \wedge w: BO(w, h) \end{cases} \quad \text{Eq. 6}$$

Equation 6 represents a back-off language model where the highest order n-grams are mostly coming from the NNLM. The first two rows in the right side of the equation correspond to the non-back-off case and the last row corresponds to the back-off case.

Embodiments of the invention then prune the back-off NNLM (i.e., the converted model). Pruning is the selection of the language model parameters to decide on which n-grams are listed explicitly in the model. Entropy-based pruning is a commonly used approach for pruning of back-off language models and is described in A. Stolcke, "Entropy-based Pruning of Back-off Language Models," Proceedings of DARPA Broadcast News Transcription and Understanding Workshop, Lansdowne, Va., USA, pp. 270-274, 1998, the disclosure of which is incorporated by reference herein in its entirety. In entropy-based pruning, the approach is to prune a higher order n-gram if the lower order n-gram is sufficiently informative. More formally, relative entropy between the original model and the pruned model is calculated after pruning a single n-gram. If the relative entropy change is less than a given threshold, this n-gram is pruned. Otherwise, it is kept in the model.

One embodiment for converting the NNLM into the back-off language model is to train NNLMs for different n-gram orders, to build an unpruned n-gram model by putting all possible n-grams together, and then to prune this model with entropy-based pruning. However, the size of the unpruned model can be extremely large since the NNLM with smoothing (see equation 1) generates $|V|^n$ n-grams for each n-gram order. Even for a limited vocabulary size, such as 10K words, there are more than $10^{16}$ n-grams in the model. Therefore, it is not practical to represent and prune this model with currently available computational resources.

One approach implemented in an illustrative embodiment for making the problem tractable is to restrict the NNLM histories to only the ones seen in the background language model and to back off the other n-grams to the lower orders. After this restriction, there are $k \times |V_o|$ n-grams coming from the NNLM where k is the number of unique histories in the background model. This restriction is implemented in the illustrative embodiment shown in FIG. 3 and described below. However, it is to be understood that other restrictions or no such restrictions may be implemented in alternative embodiments.

In accordance with an illustrative embodiment for converting a non-back-off language model into a back-off language model, a hierarchical implementation is provided. The hierarchical implementation allows the system to use lower order NNLMs as the background language model and makes the problem tractable for entropy-based pruning despite the large number of histories for NNLMs. When a conventional n-gram language model is trained on text data, the non-back-off n-grams will be the ones that are explicitly seen in the text data. However, in the converted back-off NNLM trained on the same text data, n-grams that have never been seen in the text data can also be listed explicitly in the back-off language model. Therefore, the converted model is not restricted with only the training data n-grams.

It is also to be understood that while an illustrative embodiment uses entropy-based pruning, other pruning methodologies such as cut-off based pruning methodologies based on estimated counts can be employed in alternative embodiments.

Figure 3:
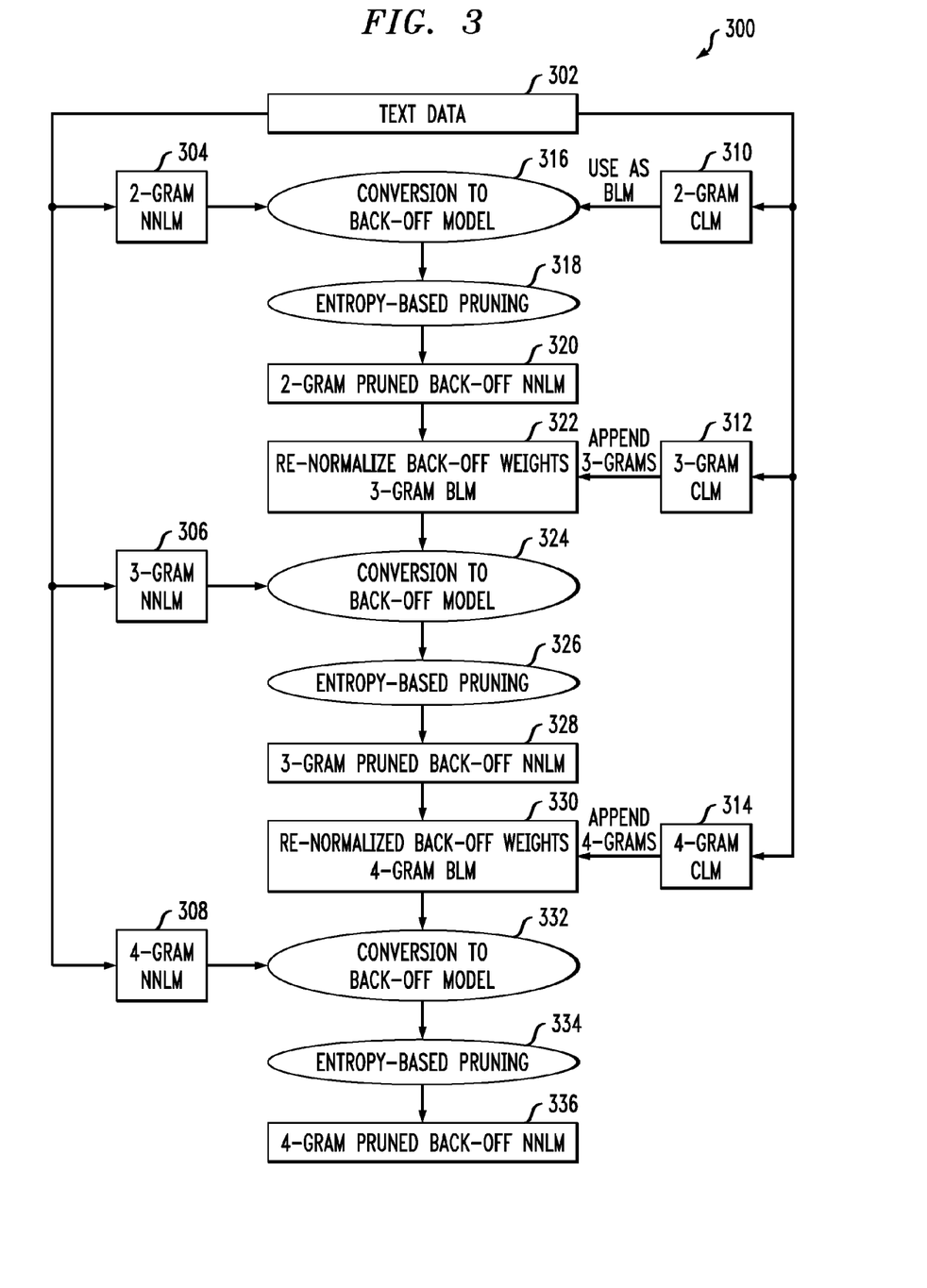
FIG. 3 illustrates a language model conversion methodology, according to an embodiment of the invention.

FIG. 3 illustrates a language model conversion methodology, according to an embodiment of the invention. Note that methodology 300 can be implemented by language model conversion module 120 in the ASR system 100 of FIG. 1. Note also that the methodology 300 illustrates conversion of a 4-gram NNLM to a back-off language model. However, the methodology 300 applies in a straightforward manner to conversion of any n-gram NNLM.

A conventional n-gram language model is represented in FIG. 3 as "CLM." In order to obtain a 4-gram back-off NNLM, the methodology 300 uses the lower order NNLMs (3-gram and 2-gram NNLMs) for backing off. Therefore, a 2-gram NNLM (304), a 3-gram NNLM (306) and a 4-gram NNLM are trained using the text data 302. Also for smoothing the probabilities for zero probability events in the NNLMs, the methodology 300 trains a 2-gram CLM (310), a 3-gram CLM (312) and a 4-gram CLM (314).

The methodology 300 starts from 2-grams. In step 316, the 2-gram NNLM 304 and the 2-gram CLM 310 are combined as the background language model (BLM) by using equation 6 above, and a 2-gram back-off NNLM is generated. Initially, this model has a large number of 2-grams (exactly $|V| \times |V_o|+2$-grams coming from the background language model where the predicted word is not in $V_o$). This model is pruned with entropy-based pruning in step 318 and a 2-gram pruned back-off NNLM 320 is generated.

The size of this model is determined by the pruning threshold. Lower pruning thresholds keep more n-grams explicitly in the model. In step 322, 3-grams coming from the CLM 312 are appended to the model 320 and, after renormalization of the back-off weights for 2-grams, the model serves as a 3-gram background language model. Note that the hierarchical approach in methodology 300 allows for the use of lower order NNLMs for backing off and the same order CLM probabilities for smoothing zero probability events. The 3-gram NNLM is converted into a back-off language model in step 324 by using the 3-gram BLM. This model is pruned with entropy-based pruning in step 326 and a 3-gram pruned back-off NNLM 328 is generated. Then, the same procedure is used until the highest order pruned back-off NNLM is obtained, in this example, 4-grams.

That is, in step 330, 4-grams coming from the CLM 314 are appended to the model 328 and, after renormalization of the back-off weights for 3-grams, the model serves as a 4-gram background language model. The 4-gram NNLM is converted into a back-off language model in step 332 by using the 4-gram BLM. This model is pruned with entropy-based pruning in step 334 and a 4-gram pruned back-off NNLM 336 is generated. The 4-gram pruned back-of NNLM is then used as the language model 112 by ASR decoder 110 in FIG. 1.

Experiments for language model conversion embodiments of the invention were performed on an English Broadcast News task. The baseline system was based on the 2007 IBM GALE™ (International Business Machines Corporation, Armonk N.Y.) speech transcription system (see S. F. Chen et al., "Advances in Speech Transcription at IBM Under the DARPA EARS Program," IEEE Transactions on Audio, Speech, and Language Processing, vol. 14, no. 5, pp. 1596-1608, 2006, the disclosure of which is incorporated by reference herein in its entirety). The discriminatively-trained speaker adaptive acoustic model was trained on 430 hours of Broadcast News audio. The language model training text consists of 55M words. A 4-gram conventional language model was built using a 80K vocabulary. This model serves as the baseline language model in the experiments. We used rt04 as the test set.

We trained NNLMs on the same 55M word corpus. The most frequent 20K words in the vocabulary were used as the output vocabulary. 2-gram, 3-gram and 4-gram NNLMs were trained with 120 dimensional input features and 800 hidden units. A 4-gram back-off language model was generated by converting the NNLM with the hierarchical implementation according to methodology 300 in FIG. 3. We used NNLMs up to 4-grams for the conversion. The pruning threshold for each n-gram order was chosen to keep the number of n-grams the same with the unpruned baseline language model. This 4-gram back-off language model was interpolated with the baseline 4-gram language model before being used in decoding. The interpolation weight was chosen to minimize the perplexity on a set-apart held-out set containing 49K words. We also trained a 6-gram NNLM with 120 dimensional input features and 800 hidden units. This 6-gram NNLM was used for rescoring lattices generated by the baseline language model and by the 4-grain back-off language model converted from the NNLM. The NNLM was interpolated with the baseline language model before rescoring lattices and the interpolation weight was optimized on the held-out set to minimize the perplexity.

We performed the decoding experiments with the 4-gram back-off NNLM after interpolating it with the baseline language model. The word error rate (WER) results with the baseline language and the back-off NNLM are given Table 1 below. The baseline WER on rt04 test set is 14.7%. The NNLM converted into a back-off language model reduces the WER to 13.7%, yielding 1% absolute improvement (statistically significant at $p<0.001$) on top of the baseline language model. Then, we rescore the lattices generated by the baseline language model and the back-off NNLM with the 4-gram and 6-gram NNLMs after interpolating them with the language models utilized in decoding. Rescoring the baseline lattices with the 4-gram and 6-gram NNLMs yielded 13.3% and 13.2% WERs, respectively. Rescoring the lattices by the back-off NNLM with the 4-gram and 6-gram NNLMs yielded 13.0% and 12.8% WERs, respectively. A best result is obtained as 12.8% and this gives 0.4% improvement (significant at $p<0.001$) on top of the result, 13.2%, obtained with rescoring the baseline lattices with the 6-gram NNLM. Early integration of the NNLM in decoding results in better output lattices, so that rescoring these lattices with a complementary model, non-back-off NNLM, yields better results.

TABLE 1

Performance of Back-off Neural Network Language Model

| Model | WER |
| --- | --- |
| 4-gram Baseline LM | 14.7% |
| +rescore with 4-gram NNLM (non-back-off) | 13.3% |
| +rescore with 6-gram NNLM (non-back-off) | 13.2% |
| 4-gram Baseline LM + 4-gram pruned back-off NNLM | 13.7% |
| +rescore with 4-gram NNLM (non-back-off) | 13.0% |
| +rescore with 6-gram NNLM (non-back-off) | 12.8% |

As will be appreciated by one skilled in the art, embodiments of the invention may be embodied as a system, apparatus, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 3, the diagrams in the figures illustrate the architecture, functionality, and operation of possible implementations of systems, methods and computer program products according to various embodiments of the invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-3, can also include, as described herein, providing a system, wherein the system includes distinct modules (e.g., modules comprising software, hardware or software and hardware). By way of example only, the modules may include but are not limited to the language model conversion module. These and other modules may be configured, for example, to perform the steps described and illustrated in the context of FIGS. 1-3.

Figure 4:
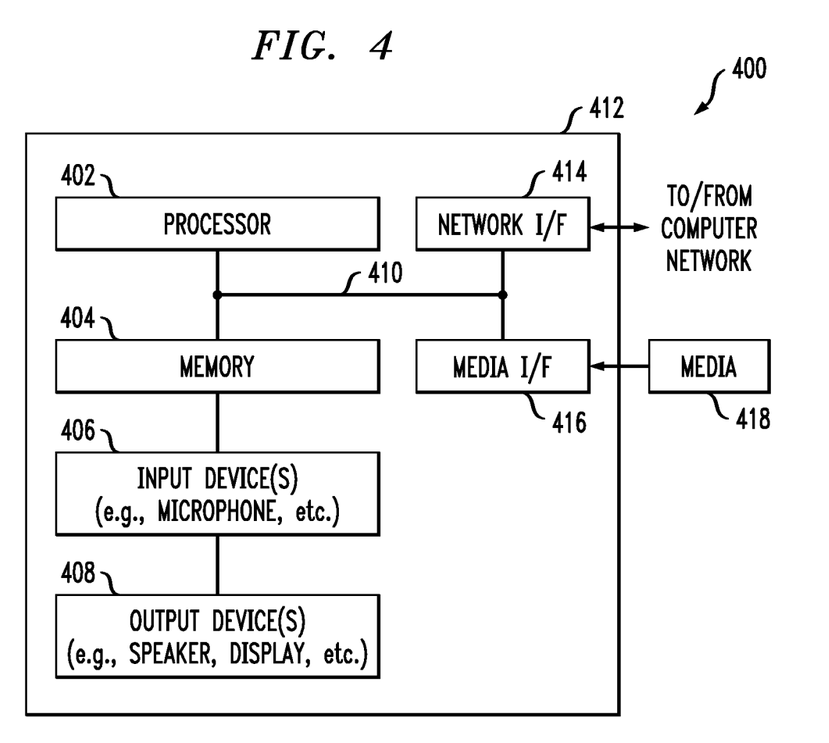
FIG. 4 illustrates a computing system in accordance with which one or more components/steps of a language model conversion module/methodology are implemented, according to an embodiment of the invention.

One or more embodiments can make use of software running on a general purpose computer or workstation. With reference to FIG. 4, such an implementation 400 employs, for example, a processor 402, a memory 404, and input devices 406 (e.g., microphone, keyboard, pointing device, etc.) and output devices 408 (e.g., audio speaker, display screen, etc.). The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output devices" as used herein, is intended to include (but not be limited to) one or more mechanisms for inputting data to the processing unit and one or more mechanisms for providing results associated with the processing unit.

The processor 402, memory 404, and input/output devices 406/408 can be interconnected, for example, via bus 410 as part of a data processing unit 412. Suitable interconnections, for example, via bus 410, can also be provided to a network interface 414, such as a network card, which can be provided to interface with a computer network, and to a media interface 416, such as a diskette or CD-ROM drive, which can be provided to interface with media 418.

A data processing system suitable for storing and/or executing program code can include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input/output (I/O) devices 406/408 can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, a server includes a physical data processing system (for example, system 412 as shown in FIG. 4) running a server program. It will be understood that such a physical server may or may not include a display and keyboard.

Accordingly, it is to be understood that the computer architecture 400 shown in FIG. 4 may represent one illustrative implementation of the ASR system 100 as shown in FIG. 1 (or a machine translation system). Also, the computer architecture 400 could represent an illustrative implementation of a client, e.g., a laptop, tablet, smartphone, or personal computer.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   converting a non-back-off language model to a back-off language model using a background language model, wherein the non-back-off language model assigns a probability to any fixed order n-gram without backing off to lower order n-gram probabilities, and wherein the background language model assigns a non-zero probability to n-grams assigned a zero probability by the non-back-off language model; and
   pruning the converted back-off language model;
   wherein the converted back-off language model assigns a probability to a given fixed order n-gram assigned a zero probability by the non-back-off language model and not assigned a fixed order probability by the background language model by backing off to a given lower order n-gram corresponding to the given fixed order n-gram;
   wherein the given fixed order n-gram comprises a given word and an associated history;
   wherein the given lower order n-gram comprises the given word and a truncated version of the associated history;
   wherein lower order n-grams originate from at least one lower order non-back-off language model after converting the lower order non-back-off language model to the back-off language model and highest order n-grams originate from an n-gram language model; and
   wherein the converted back-off language model is usable for decoding speech, and the converting and pruning steps are executed via a processor device configured to implement at least one speech decoder associated with an automatic speech recognition system configured to integrate the converted back-off language model into a decoding process.

2. The method of claim 1, wherein the at least one lower order non-back-off language model is used as the background language model.

3. The method of claim 1, wherein the non-back-off language model comprises a neural network language model.

4. The method of claim 1, wherein the converting step further comprises starting with an initial non-back-off language model associated with a lowest order n-gram and hierarchically progressing with one or more higher order non-back-off language models until a highest order n-gram is reached.

5. The method of claim 1, wherein the pruning step further comprises entropy-based pruning the converted back-off language model to select a number of n-grams for the converted back-off language model.

6. The method of claim 1, wherein the pruning step further comprises cut-off based pruning based on estimated counts to select a number of n-grams for the converted back-off language model.

7. The method of claim 1, wherein all possible n-grams are evaluated before pruning the converted back-off language model.

8. The method of claim 1, wherein n-grams that remain in the final converted back-off language model are not restricted to training data n-grams.

9. The method of claim 1, wherein named-entities are kept explicitly in the converted back-off language model.

10. The method of claim 1, wherein the background language model is used to directly assign probabilities to frequent n-grams.

11. The method of claim 1, wherein the number of histories and n-grams used to generate the converted back-off language model are restricted by using the most frequent K words in an associated vocabulary to speed up the converting and pruning steps.

12. The method of claim 1, wherein the converted back-off language model is usable in a machine translation system.

13. The method of claim 1, wherein at least portions of the converting and pruning steps are parallelized.

14. The method of claim 1, wherein the non-back-off language model comprises a plurality of non-back-off estimates and the back-off language model comprises a plurality of back-off estimates and a plurality of non-back-off estimates.

15. The method of claim 1, further comprising appending one or more higher order n-grams to the lower order non-back-off language model after converting the lower order non-back-off language model to the back-off language model.

16. The method of claim 1, further comprising normalizing back-off weights of the background language model.

17. The method of claim 1, wherein the converted back-off language model is given by:

$$P(w \mid h) = \beta(h) P_{NNLM}(w \mid h) \quad \text{if} \quad w \in V_o$$
$$P_{BLM}(w \mid h) \quad \text{if} \quad w \notin V_o \wedge w: \neg BO(w, h)$$
$$\alpha(h) P_{BLM}(w \mid h') \quad \text{if} \quad w \notin V_o \wedge w: BO(w, h)$$

where P(w|h) denotes the probability assigned to a fixed order n-gram comprising word w and an associated history h, $\beta(h)$ denotes a normalization constant for history h, $P_{NNLM}(w|h)$ denotes the probability assigned to the fixed order n-gram by the non-back-off language model, $V_o$ denotes an output vocabulary of the non-back-off language model, $P_{BLM}(w|h)$ denotes the fixed order probability assigned by the back-off language model, $\alpha(h)$ denotes a back-off weight associated with history h, h' denotes a truncated version of history h, $P_{BLM}(w|h')$ denotes the probability assigned by backing off to the lower-order n-gram corresponding to the fixed order n-gram, w:¬ BO(w,h) denotes that the fixed order n-gram is assigned a probability by the background language model, and w:BO(w,h) denotes that the fixed order n-gram is not assigned a probability by the background language model.

18. The method of claim 1, wherein the truncated version of the history is obtained by dropping a last word of the associated history.

* * * * *